April 17, 1962 KOZO HIGUCHI ET AL 3,030,412
METHOD OF MANUFACTURING AMMONIUM NITROHUMATE
Filed March 15, 1960
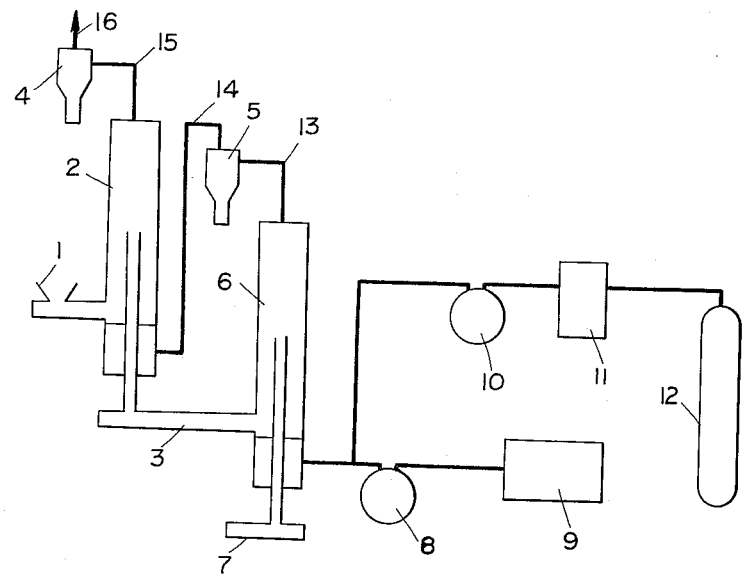
INVENTORS
KOZO HIGUCHI
MICHIO TSUYUGUCHI
TESTURO OSA
KOJI ANDO
BY
ATTORNEY

3,030,412
METHOD OF MANUFACTURING AMMONIUM NITROHUMATE

Kozo Higuchi, Michio Tsuyuguchi, Tetsuro Osa, and Koji Ando, all of Tokyo, Japan, assignors to Hokkaido Tanko Kisen Kabushiki Kaisha, Tokyo, Japan, a corporation of Japan
Filed Mar. 15, 1960, Ser. No. 15,175
Claims priority, application Japan Mar. 19, 1959
3 Claims. (Cl. 260—515)

This invention relates to a method of manufacturing ammonium nitrohumate.

An object of this invention is to provide a method of manufacturing continuously ammonium nitrohumate directly from solid nitrohumic acid which is used as the starting material.

Another object of the invention is to provide a method of manufacturing ammonium nitrohumate very economically without any loss at all of the ammonia gas used.

A still another object of the invention is to provide a continuous method of manufacturing ammonium nitrohumate that is industrially practicable whereby the ammonium nitrohumate can be obtained with a high yield smoothly without the attendance of undesirable phenomena such as side reactions and fusional adhesive reactions.

Further objects of the invention will become apparent from the description to be given hereinafter.

Heretofore, the method of manufacturing solid ammonium nitrohumate by first obtaining liquid ammonium nitrohumate by reacting ammonia water with nitrohumic acid or a substance containing the same and thereafter evaporating the water therefrom is known. However, in this method the amount of ammonia used is large. Furthermore, not only a great amount of heat is required for evaporating the water, but also products of uniform quality are difficult to obtain.

When we proceeded with studies into the method of obtaining ammonium nitrohumate in the solid form directly using solid nitrohumic acid as the starting material and reacting ammonia gas therewith, on account of the fact that generally in this case undesirable side reactions were brought about such as the neutralizing reaction of the phenol radicals as well as the formation of an acid amide with the lactone type acid radicals besides the formation of ammonium salts between the free carboxylic radicals of nitrohumic acid and the ammonia gas used, the consumption of ammonia gas became excessive. Furthermore, in case the dryness of the material nitrohumic acid is not sufficient, with fusional adhesion being brought about between the particles of the material nitrohumic acid as the reaction proceeds, the removal of the finished product became exceedingly difficult. Thus, since it became necessary first to dry sharply the material nitrohumic acid so that its water content was less than 2%, a great amount of time, energy and effort was required for such drying.

When we were furthering our studies into the method of manufacturing ammonium nitrohumate in the solid form directly from solid nitrohumic acid that is used as the starting material, we found surprisingly that during the reaction of solid nitrohumic acid with ammonia if the ammonia was diluted with a gas that does not participate in the reaction, not only were the aforementioned undesirable side reactions markedly suppressed, but also it was not necessary to dry sharply to less than 2% the water content of the material nitrohumic acid as in the above case, and also that fusional adhesion was not caused at all between the particles of the ammonium nitrohumate product even when the material nitrohumic acid was only dried to the extent to where the water content was about less than 15%.

According to results of experiments, it was observed that favorable effects even occurred when the ammonia content was made to be about 90% by weight, and it became evident that practically all of the undesirable side reactions and the phenomenon of fusional adhesion such as described hereinabove could be suppressed if the content was made less than 70% by weight, particularly less than 60% by weight. And for the purpose of dilution, besides air, nitrogen, and natural gas, any gas which does not react substantially with nitrohumic acid and ammonia gas at less than 100° C. such as the combustion waste gases from which carbon dioxide gas has been removed can be used.

Moreover, in this invention, inasmuch as the reaction between nitrohumic acid and ammonia is carried out very smoothly, no matter how small the diluted ammonia gas becomes, no trouble whatsoever is caused with respect to the carrying out of the reaction.

Thus, in accordance with this invention by diluting the ammonia gas, which participates in the reaction with nitrohumic acid, with a diluent gas, which does not affect the reaction such as air, nitrogen, etc., it is possible to suppress the undesirable side reactions and phenomenon of fusional adhesion as well as to utilize the fluidized bed reaction method by means of the combined use of a diluent gas. Hence, not only can ammonium salts be obtained directly very smoothly as well as economically from powdered nitrohumic acid or substances that contain the same, but also uniform quality ammonium nitrohumate can be advantageously manufactured continuously on an industrial scale without the attendance of any hindrances whatsoever. Furthermore, since in this invention, there being no limit as to how small the ammonia content in the dilute ammonia gas becomes, the dilute ammonia gas which has once been used in the reaction by the fluidized bed can be used over again as to fully utilize its ammonia content in carrying out the reaction.

In addition, while in this invention, if in the reaction between nitrohumic acid or substances containing nitrohumic acid and dilute ammonia gas the temperature becomes over 100° C., a dehydrating reaction occurs in the ammonium nitrohumate formed and with the ammonium salt of a carboxylic acid being converted to acid amides, the yield of the desired product that is readily soluble in water decreases conspicuously. Therefore, while a temperature of over 100° C. is not desirable, any low temperature to the extent that condensation of the ammonia gas is not caused, for example, in the range of about from −33.6° C. to 100° C. can be used.

Next, while referring to the accompanying drawing, the invention will be described in further detail. The accompanying drawing is a process drawing illustrating a suitable embodiment for practicing the invention comprising a method of manufacturing an ammonium salt from nitrohumic acid or a substance containing nitrohumic acid while using a fluidized bed. In the drawing, 1 is the supply inlet for the material nitrohumic acid, 2, the ammonia recovery tower, and 3, the feeder for supplying the material nitrohumic acid subsequent to its preliminary reaction. 4 and 5 are both dust collectors, 6 is the reaction tower, 7, the finish product delivery outlet, 8, the air flowmeter, 9, the diluent gas supplier, 10, the ammonia gas flowmeter 11, the ammonia carburetor 12, the ammonia tank, and 13, 14, 15, and 16 show respectively the outlet pipes for the reaction gases. The ammonia gas evolved from the ammonia carburetor 12 is metered at the ammonia gas flowmeter 10 and after mixing with the diluent gas metered similarly at the flowmeter 8 is supplied to the reaction tower 6 from the bottom thereof. After reacting with the material nitrohumic acid present in the reaction tower 6, it then passes through the pipe 13, the dust collector 5 and the pipe 14, and is introduced into the bottom of the ammonia recovery tower 2. Here, the small amount of ammonia gas contained in the waste gases reacts completely with the material nitrohumic acid, which by being supplied from the material nitrohumic acid supply inlet 1 is present in said recovery tower 2. Then, after passing through the pipe 15, the dust collector 4, and the pipe 16, the gas is exhausted. On the other hand, the material nitrohumic acid having been supplied from the supply inlet 1 and after having completed its preliminary reaction in the ammonia recovery tower, passes out through the overflow pipe and is delivered into the reaction tower 6 by means of the feeder for supplying the material nitrohumic acid subsequent to its preliminary reaction 3, wherein it is reacted with fresh dilute ammonia gas. The product ammonium nitrohumate having completed its reaction in the tower 6 passes out through the overflow pipe and then to the finished product delivery outlet 7 from where it is removed.

In view of the fact that in this invention the reaction with the material nitrohumic acid proceeds with extreme smoothness without the attendance of any side reactions no matter how low the concentration of ammonia becomes in the material dilute ammonia gas, if an apparatus as described hereinabove is used, the ammonia gas is completely utilized with no loss whatsoever.

In order to more clearly understand this invention, the following specific examples are given, it being understood that the same are merely intended in an illustrative sense, and the invention should not be limited thereby, but only insofar as the same may be limited by the appended claims.

EXAMPLE 1

While using the apparatus as shown in the accompanying drawings, the material nitrohumic acid and ammonia gas diluted with air were reacted employing a fluidized bed, with however only the reaction tower 6 being used in order that the ammonia gas utilization rate could be measured. The reaction conditions and results are shown in Table I, below, in which Nos. 1–7 show those instances in accordance with the method of this invention, and Nos. A and B have been given as reference to show for purpose of comparison the experimental conditions and the results of instances in which the concentrations of ammonia in the reactant gases were respectively in weight percentages 71% and 100%, i.e., pure ammonia gas in the latter case.

Table I

| Experiment No. | Reaction Conditions | | | | Reaction Results | | | |
|---|---|---|---|---|---|---|---|---|
| | Gas flow rate (cm./sec.) | NH$_3$ (wt. percent) | Material water content (percent) | Average residence time (min.) | Nitrogen content in ammonia form in product (percent) | Solubility (percent) | Fusinal adhesion | Rate of NH$_3$ utilization (percent) |
| 1 | 4.4 | 5 | 9.3 | 6 | 1.7 | 33.2 | None | 100.0 |
| 2 | 5.5 | 10 | 9.3 | 5 | 2.2 | 45.5 | do | 100.0 |
| 3 | 6.7 | 20 | 9.3 | 5 | 3.5 | 62.4 | do | 100.0 |
| 4 | 7.8 | 30 | 9.3 | 6 | 4.5 | 69.8 | do | 96.3 |
| 5 | 8.9 | 40 | 9.3 | 5 | 4.5 | 68.7 | do | 94.6 |
| 6 | 12.2 | 50 | 9.3 | 3 | 4.8 | 70.4 | do | 89.7 |
| 7 | 7.8 | 60 | 9.3 | 4 | 4.9 | 70.0 | Somewhat | 88.0 |
| A | 11.1 | 71 | 9.3 | 3.5 | 5.4 | 70.0 | Excessive | 80.0 |
| B | 2.2 | 100 | 9.3 | 5 | 5.6 | 40.0 | Great; removal impossible. | 40.0 |

As is apparent from the above Table I, when the concentration of the ammonia (weight percentage) in the reactant gas exceeds 60%, fusional adhesion starts to appear somewhat in the reaction zone, it becoming exceedingly conspicuous as 70% is exceeded, and at 100%, i.e., pure ammonia gas, the fusional adhesion becomes such that the removal of the product becomes next to impossible. It also can be seen that the ammonia utilization rate is relatively good when its concentration in the reactant gas is less than 70% and thus comes within the range of this invention, but falls precipitously as the concentration becomes more than 70%. Furthermore, as is clear from experiment Nos. 1 and 2 of Table I no matter how low the concentration of the ammonia in the reactant gas becomes, no hindrane whatsoever arises. Rather the utilization rate of the ammonia is enhanced, reaching 100%.

EXAMPLE 2

This example was carried out in an identical manner as Example 1, except that the water content of the material nitrohumic acid was varied, and the phenomenon of fusional adhesion was investigated. The results are as shown in Table II, below.

Table II

| Experiment No. | Reaction Conditions | | | | Reaction Results | | | |
|---|---|---|---|---|---|---|---|---|
| | Gas flow rate (cm./sec.) | NH$_3$ (wt. percent) | Material water content (percent) | Average residence time (min.) | Nitrogen content in ammonia form in product (percent) | Solubility (percent) | Fusinal adhesion | Rate of NH$_3$ utilization (percent) |
| 8 | 6.7 | 20 | 15.5 | 7 | 4.8 | 70.2 | Somewhat | 89.5 |
| 9 | 6.7 | 20 | 13.5 | 7 | 4.7 | 70.3 | None | 90.6 |
| 10 | 6.7 | 20 | 9.3 | 5 | 3.5 | 62.4 | do | 100.0 |
| 11 | 6.7 | 20 | 7.2 | 7 | 4.9 | 66.3 | do | 88.0 |
| 12 | 6.7 | 20 | 2.2 | 5 | 2.1 | 45.3 | do | 100.0 |

As is apparent from the above Table II, in accordance with this invention, even if the dryness of the material nitrohumic acid is such that the water content became 15% by weight, fusional adhesion still did not occur, and it was not only possible to cause the reaction to proceed smoothly but also the ammonia utilization rate was exceedingly high.

While in the experiments shown in Examples 1 and 2, the reaction zone showed temperatures of about 60°–80° C. as a result of the reaction temperature, the temperatures in case of references Nos. A and B whose reaction conditions were not in accordance with this invention reached respectively 82° C. and 125° C., exhibiting a tendency not desirable as conditions for the manufacture of ammonium nitrohumate.

While we have shown and described a preferred embodiment of our invention, it will be understood that it is not to be limited to all of the details shown, but is

What is claimed is:

1. A method of manufacturing ammonium nitrohumate which comprises reacting at a temperature within the range of about −33.6° C. to 100° C. nitrohumic acid in powdered state with dilute ammonia gas in a fluidized bed, said dilute ammonia gas containing ammonia in an amount less than 70% by weight, said dilute ammonia gas being prepared by diluting the ammonia with a diluent gas selected from the group consisting of air, nitrogen, natural gas and combustion waste gases from which carbon dioxide gas has been removed.

2. A method of manufacturing ammonium nitrohumate which comprises reacting at a temperature within the range of about −33.6° C. to 100° C. nitrohumic acid in powdered form having a moisture content less than 15% by weight with dilute ammonia gas in a fluidized bed, said dilute ammonia gas containing ammonia in an amount less than 70% by weight, said dilute ammonia gas being prepared by diluting the ammonia with a diluent gas selected from the group consisting of air, nitrogen, natural gas and combustion waste gases from which carbon dioxide gas has been removed.

3. Ammonium nitrohumate produced by a method which comprises reacting, at a temperature within the range of about −33.6° C. to 100° C., nitrohumic acid in powder form having a moisture content of less than 15% by weight with dilute ammonia gas in a fluidized bed, said dilute ammonia gas containing ammonia in an amount less than 70% by weight, said dilute ammonia gas being prepared by diluting the ammonia with a diluent gas selected from the group consisting of air, nitrogen, natural gas, and combustion waste gases from which carbon dioxide gas has been removed.

References Cited in the file of this patent

Dragunov et al.: Chem. Abstracts, vol. 32, 5566³, 1938.